(12) United States Patent
Steurer et al.

(10) Patent No.: US 11,016,452 B2
(45) Date of Patent: May 25, 2021

(54) INTERFACE FOR POWER SYSTEMS

(71) Applicant: The Florida State University Research Foundation, Inc., Tallahassee, FL (US)

(72) Inventors: Michael Steurer, Crawfordville, FL (US); Karl Schoder, Crawfordville, FL (US); Mark Stanovich, Crawfordville, FL (US); James Langston, Crawfordville, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 63 days.

(21) Appl. No.: 16/280,711

(22) Filed: Feb. 20, 2019

(65) Prior Publication Data

US 2019/0258211 A1 Aug. 22, 2019

Related U.S. Application Data

(60) Provisional application No. 62/632,617, filed on Feb. 20, 2018.

(51) Int. Cl.
*G05B 17/02* (2006.01)
(52) U.S. Cl.
CPC .................. *G05B 17/02* (2013.01)
(58) Field of Classification Search
CPC .............. G05B 17/02; G05B 19/0423; G05B 2219/23446
See application file for complete search history.

(56) References Cited

U.S. PATENT DOCUMENTS

| | | | |
|---|---|---|---|
| 2010/0049486 A1* | 2/2010 | Xu | G05B 17/02 703/6 |
| 2014/0015555 A1* | 1/2014 | Fox | H02S 50/10 324/750.01 |
| 2016/0042103 A1* | 2/2016 | Kusunoki | G06F 30/20 703/13 |
| 2017/0169140 A1* | 6/2017 | Chen | G01R 31/40 |
| 2018/0129176 A1* | 5/2018 | Chi | G05B 23/0216 |

(Continued)

OTHER PUBLICATIONS

T.V. Vu, et al., "Robust adaptive droop control for DC microgrids," Electr. Power Syst. Res. 146 (2017) 95-106.

(Continued)

*Primary Examiner* — Charles R Kasenge
(74) *Attorney, Agent, or Firm* — Meunier Carlin & Curfman LLC

(57) ABSTRACT

A controller hardware in the loop (CHIL) interface is disclosed. The CHIL interface comprises software and hardware that redirects a signal flow, including modulation signals and measurements exchanged between controller logic and a power electronics converter (PEC), to a CHIL port. Accordingly, the CHIL port provides access to the controller logic, at a digital level, throughout phases of the controller's lifetime (i.e., design, installation, maintenance, upgrade). Thus, the CHIL interface facilitates the use of PEC simulators for testing. The CHIL interface can detach the actual PEC from the control logic so testing can be performed with or without an operating PEC and can avoid the need for dedicated and error prone signal conditioning circuitry that is external to the controller.

10 Claims, 2 Drawing Sheets

(56) References Cited

U.S. PATENT DOCUMENTS

2018/0233921 A1* 8/2018 Kangas ............... H02M 11/00
2019/0146434 A1* 5/2019 Fast ..................... G05B 19/05
                                                                                 700/37

OTHER PUBLICATIONS

IEEE 1676-2010, "Guide for Control Architecture for High Power Electronics (1 MW and Greater) Used in Electric Power Transmission and Distribution Systems" 2011, 46 pages. DOI: 10.1109/IEEESTD.2011.5712778.

* cited by examiner

INTERFACE FOR POWER SYSTEMS

CROSS-REFERENCE TO RELATED APPLICATION

This application claims priority to and benefit of U.S. provisional patent application Ser. No. 62/632,617 filed Feb. 20, 2018, which is fully incorporated by reference and made a part hereof.

GOVERNMENT SUPPORT

This invention was made with government support under Grant No. N00014-16-1-2956 awarded by the Office of Naval Research. The government has certain rights in the invention.

FIELD OF THE INVENTION

The present disclosure relates to power systems and more specifically, to an interface that can redirect signals exchanged between control logic of a controller and a power electronics converter in a power conversion system.

BACKGROUND

Applications of power electronics (e.g., in the areas of power quality, custom power, flexible AC transmission systems (FACTS), high voltage DC transmission (HVDC), distributed generation, energy storage, etc.) have benefitted recently from advances in power electronics components and controls. For example, today's power electronics converters (PECs) may operate in a power range from hundreds of kilowatts (kW) to thousands of megawatts (MW) and may operate at higher switching frequencies than ever before. Additionally, advancements in control platform (i.e., PEC controller) processing capabilities allow for hi-fidelity control of the power electronics.

It is often desirable to test the logic of the PEC controller in simulation in order to prevent problems associated with working with the PEC directly. Presently these tests require the controller to be disconnected from the PEC and coupled to a PEC simulator using custom, ad hoc, signal conditioning circuitry to achieve an accurate simulation. This approach is prone to errors, and the customized nature of this approach does not accommodate variations in PEC hardware as is common in the field.

Given the rapidly changing requirements for PECs, the PEC controller is likely to receive many upgrades over its operating life. The ability to easily interface to the controls of various PECs over their operating life is highly beneficial as any issues with new/upgraded logic may be identified early in a development cycle and avoid costly redesigns.

A need, therefore, exists for a controller hardware in the loop (CHIL) interface that is integrated with the PEC controller to facilitate developing and testing of controllers and power electronic converters used in power conversion systems by providing a convenient interface between the controller and a PEC simulator.

SUMMARY

Accordingly, in one aspect, the present disclosure embraces a Controller Hardware-in-the-Loop (CHIL) interface. The CHIL interface facilitates development and testing of the embedded controls while simulating the power stages and rest-of-system. A CHIL interface can be integrated into power electronic converter controllers which will remain on the unit throughout a converter's lifetime. Accordingly, testing and developing (e.g., of the controller and/or PEC) is made possible during the entire lifecycle of a power conversion system. The CHIL interface can be standardized to avoid costly one-off solutions for every vendor of power electronic converters.

The CHIL interface allows redirecting the flow of digital signals into and out of control logic (e.g., processor) of a controller. Because the CHIL interface exchanges digital information directly with the processor, there is no need to alter a connection between the controller and a power electronics converter when using a PEC simulator during development and testing activities. Accordingly, the CHIL interface avoids the complexities associated with analog signal processing, which can unintentionally introduce artifacts. Thus the CHIL interface allows for testing and development that is less prone to errors, as information between the controller and the PEC simulator is exchanged without the need for custom, potentially ad hoc, and error-prone signal conditioning. Furthermore, the CHIL interface allows for improved simulators that provide real-time simulation of detailed switching models and accommodate the use of average value models and their respective modulation signals, which is especially important for switching frequencies beyond a few kilohertz. In addition, the CHIL interface (i.e., the CHIL port of the CHIL interface) enables many possible configurations of actual deployed hardware and simulated system components. These advantages are especially important because continued testing and development is likely for power conversion system to address an ever expanding scope and complexity of cyber vulnerabilities. The CHIL port will facilitate verifying and validating proper upgrades (e.g., to controller code), even in the field.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 2 also details aspects of the PEC simulator's capabilities.

DETAILED DESCRIPTION

Figure 1:
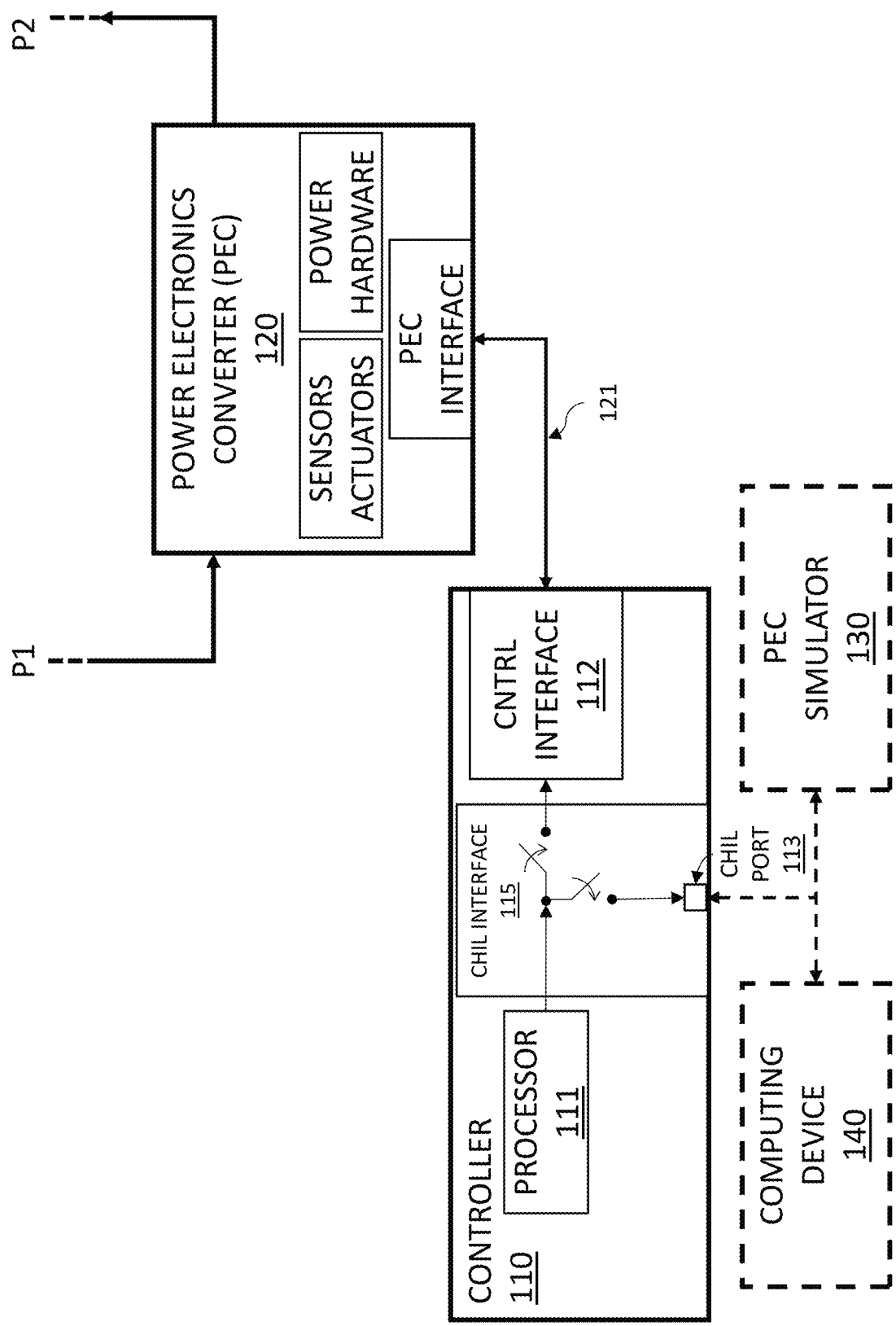
FIG. 1 schematically depicts a power conversion system according exemplary embodiment of the present disclosure.

FIG. 1 schematically depicts a power conversion system. The power conversion system includes a PEC 120 that is configurable to convert electrical energy from one form to another. The power conversion system also includes a controller 110 that is connected to the PEC 120 via a control interface 112 and that controls the operation of the PEC 120. The controller 110 includes a processor 111 and a controller hardware in the loop (CHIL) interface 115 that is configurable to couple the processor 111 to a CHIL port 113 (i) instead of the PEC 120 or (ii) in addition to the PEC 120. The CHIL port 113 is integrated with the controller 110 so that a computer 140 and/or a PEC simulator 130 may be connected/disconnected to/from the CHIL port 113 at any point during the operational lifetime of the controller without altering the connection 121 between the controller and the PEC.

A PEC simulator 130 can be connected to the CHIL port 113 for testing (e.g., as part of design, development, upgrades, etc.). In testing, the PEC simulator 130 simulates the operation of the PEC 120 in response to the signals from the processor 111. In some embodiments, a computing device 140 (i.e., computer) is connected to the CHIL port 113 and/or the PEC simulator 130 and configured to aid or perform (automatically) testing of the PEC 120 and/or the controller 110 using the PEC simulator 130.

In one possible embodiment, the testing of the PEC 120 and/or the controller 110 includes configuring the CHIL interface 115 to couple the processor 111 to the CHIL port 113 and the PEC 120 so that control signals from the processor for the PEC are also received at the CHIL port 113. One or more tests are performed by (at least) comparing a first response from the PEC 120 to a second response from the PEC simulator 130, wherein the first and second responses correspond to the same control signal from the processor 111 for controlling the PEC 120.

In another possible embodiment, the testing of the PEC 120 and/or the controller 110 includes configuring the CHIL interface 115 to couple the processor 111 to the CHIL port 113 and decouple the processor 111 from the PEC 120 so that control signals from the processor 111 are only received at the CHIL port. One or more test are performed by (at least) comparing a response from the PEC simulator to a known value (desired operating value or response received while using the PEC 120), wherein the response corresponds to a control signal from the processor for controlling the PEC simulator (instead of the PEC).

Figure 2:
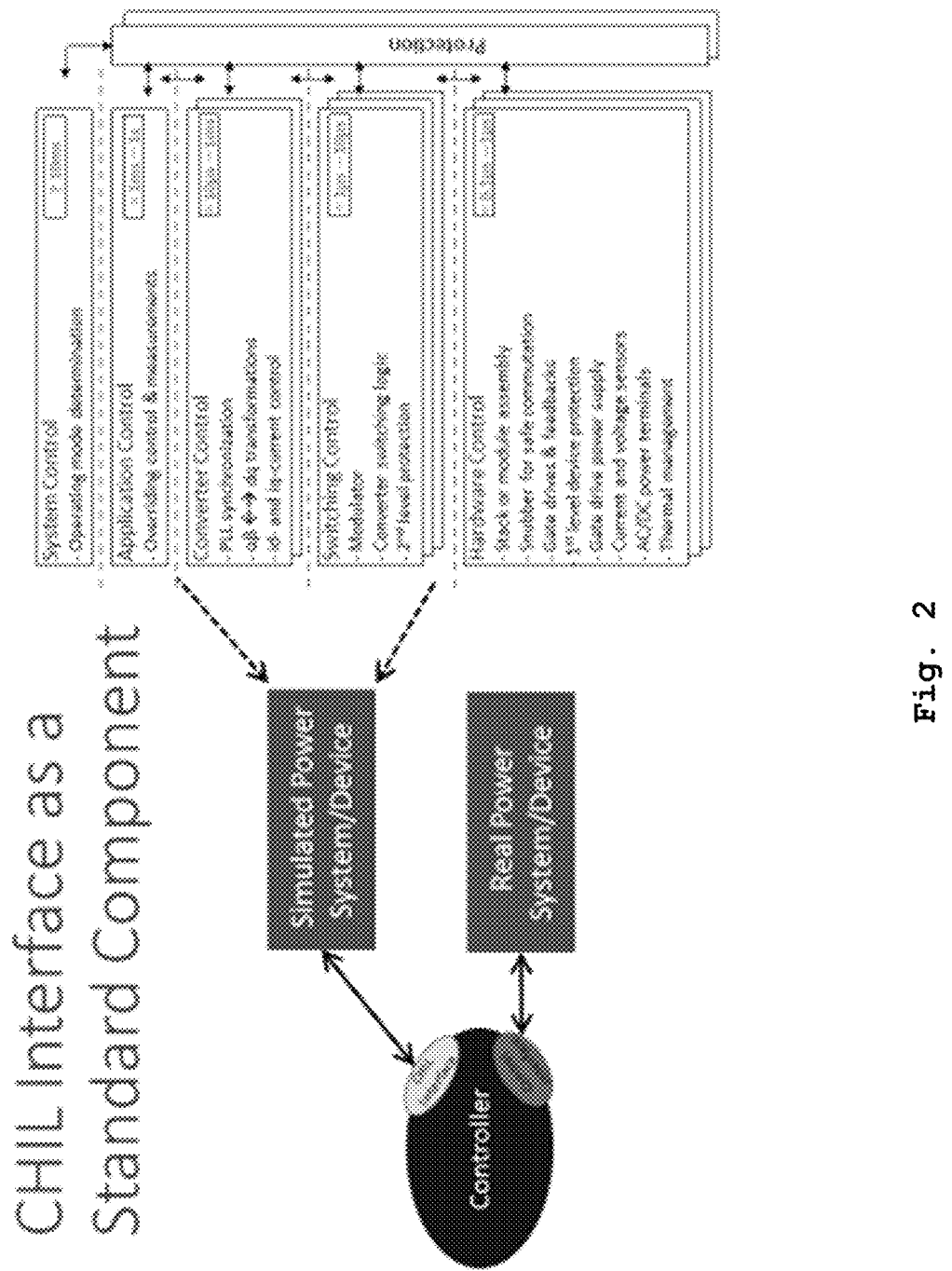
FIG. 2 graphically depicts the general connections between the controller, PEC simulator, and PEC.

FIG. 2 depicts a generalized block diagram illustrating the relationships between the controller, the CHIL interface and the PEC simulator. Additionally, FIG. 2 illustrates the capabilities of the PEC simulator. The PEC simulator simulates electrical phenomena synchronized to wall-clock time with hard real-time constraints and provides the solution of the simulation externally. FIG. 2 is adapted in part from IEEE standard 1676-2010, *"IEEE Guide for Control Architecture for High Power Electronics (1 MW and Greater) Used in Electric Power, Transmission, and Distribution Systems,"* 2010, which is hereby incorporated by reference in its entirety.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

The invention claimed is:

1. A power conversion system comprising:
a power electronics converter (PEC) that is configurable to convert electrical energy from one form to another;
a controller connected to the PEC that controls operation of the PEC, wherein the controller comprises:
a processor;
a controller hardware in loop (CHIL) port; and
a CHIL interface that is configurable to couple the processor to the CHIL port (i) instead of the PEC or (ii) in addition to the PEC;
a PEC simulator connected to the CHIL port and a computer connected to the PEC simulator and/or the CHIL port, wherein the PEC simulator simulates the operation of the PEC in response to digital signals from the processor,
wherein the computer is configured to test the PEC and/or the controller using the PEC simulator, said test comprising:
configuring the CHIL interface to couple the processor to the CHIL port and the PEC so that control signals from the processor for the PEC are also received at the CHIL port, and
(a) comparing a first response from the PEC to a second response from the PEC simulator, wherein the first and second responses correspond to the same control signal from the processor for controlling the PEC; or
(b) comparing a response from the PEC simulator to a known value, wherein the response corresponds to a control signal from the processor for controlling the PEC simulator.

2. The power conversion system according to claim 1, wherein the CHIL port is integrated with the controller so that the computer and/or the PEC simulator may be connected to or disconnected from the CHIL port at any point during the operational lifetime of the controller without altering the connection between the controller and the PEC.

3. A method for testing a power conversion system, the method comprising:
providing a power conversion system comprising a controller and a power electronics converter (PEC), wherein the controller comprises a controller hardware in loop (CHIL) interface that is configurable to couple a processor of the controller to a CHIL port on the controller (i) instead of the PEC or (ii) in addition to the PEC;
connecting a PEC simulator to the CHIL port;
configuring the CHIL interface to couple the processor to the CHIL port and the PEC so that control signals from the processor for the PEC are also received at the CHIL port; and
comparing a first response from the PEC to a second response from the PEC simulator to test the power conversion system, wherein the first and second responses correspond to the same control signal from the processor for controlling the PEC.

4. A method for testing a power conversion system, the method comprising:
providing a power conversion system comprising a controller and a power electronics converter (PEC), wherein the controller comprises a controller hardware in the loop (CHIL) interface that is configurable to couple a processor of the controller to a CHIL port on the controller (i) instead of the PEC or (ii) in addition to the PEC;
connecting a PEC simulator to the CHIL port;
configuring the CHIL interface to couple the processor to the CHIL port and decouple the processor from the PEC so that control signals from the processor are only received at the CHIL port; and
comparing a response from the PEC simulator to a known value to test the power conversion system, wherein the response corresponds to a control signal from the processor for controlling the PEC simulator.

5. The method according to claim 4, wherein the CHIL port is integrated with the controller so that the PEC simulator may be connected to or disconnected from the CHIL port at any point during the operational lifetime of the controller without altering the connection between the controller and the PEC.

6. The method according to claim 4, further comprising: connecting a computer connected to the CHIL port and/or the PEC simulator.

7. The method according to claim 6 further comprising: performing the operations of configuring and comparing at the computer.

8. A controller that controls the operation of a power electronics converter (PEC) in a power conversion system, the controller comprising:

a processor;

a controller hardware in loop (CHIL) port; and a CHIL interface that is configurable to couple the processor to the CHIL port (i) instead of the PEC or (ii) in addition to the PEC;

wherein the CHIL port is integrated with the controller so that a computer and/or a PEC simulator may be connected to or disconnected from the CHIL port at any point during the operational lifetime of the controller without altering the connection between the controller and the PEC, wherein when the PEC simulator is connected to the CHIL port, the PEC simulator simulates the operation of the PEC in response to digital signals from the processor, and wherein when a computer is connected to the CHIL port and/or the PEC simulator, the computer is configured to test the PEC and/or the controller using the PEC simulator.

9. The controller according to claim 8, wherein the test of the PEC and/or the controller comprises:

configuring the CHIL interface to couple the processor to the CHIL port and the PEC so that control signals from the processor for the PEC are also received at the CHIL port; and comparing a first response from the PEC to a second response from the PEC simulator, wherein the first and second responses correspond to the same control signal from the processor for controlling the PEC.

10. The controller according to claim 9, wherein the test of the system for converting power comprises:

configuring the CHIL interface to couple the processor to the CHIL port and decouple the processor from the PEC so that control signals from the processor are only received at the CHIL port; and comparing a response from the PEC simulator to a known value, wherein the response corresponds to a control signal from the processor for controlling the PEC simulator.

* * * * *